US008203726B2

(12) United States Patent
Ishikura et al.

(10) Patent No.: US 8,203,726 B2
(45) Date of Patent: Jun. 19, 2012

(54) IMAGE FORMING APPARATUS

(75) Inventors: Kaoru Ishikura, Kyoto (JP); Yuji Okamoto, Soraku-gun (JP); Shuhji Fujii, Kizugawa (JP); Nobuyuki Ueda, Nara (JP); Shinji Kato, Osaka (JP); Nobuyasu Yamada, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 587 days.

(21) Appl. No.: 12/382,775

(22) Filed: Mar. 24, 2009

(65) Prior Publication Data

US 2009/0237701 A1 Sep. 24, 2009

(30) Foreign Application Priority Data

Mar. 24, 2008 (JP) ................................ 2008-076053

(51) Int. Cl.
*G06F 15/00* (2006.01)
*G06F 15/16* (2006.01)

(52) U.S. Cl. ...................................... 358/1.13; 709/217

(58) Field of Classification Search ................ 358/1.13, 358/1.14

See application file for complete search history.

(56) References Cited

U.S. PATENT DOCUMENTS

| | | | |
|---|---|---|---|
| 6,738,157 | B1 | 5/2004 | Hirose |
| 6,750,878 | B1 | 6/2004 | Tatsuo et al. |
| 6,978,284 | B2 | 12/2005 | McBrearty et al. |
| 2003/0072582 | A1 | 4/2003 | Oyaide |
| 2004/0078724 | A1 | 4/2004 | Keller et al. |
| 2004/0138385 | A1 | 7/2004 | Anderson et al. |
| 2005/0237569 | A1 | 10/2005 | Takahashi |
| 2005/0248807 | A1 | 11/2005 | Kuroyanagi |
| 2006/0007469 | A1 | 1/2006 | Uruma |
| 2006/0018628 | A1 | 1/2006 | Mizuno et al. |
| 2006/0045544 | A1 | 3/2006 | Kim et al. |
| 2007/0220359 | A1 | 9/2007 | Mochizuki |
| 2008/0089709 | A1 | 4/2008 | Higashi |
| 2008/0144070 | A1 * | 6/2008 | Mori et al. .................. 358/1.13 |
| 2008/0260416 | A1 | 10/2008 | Nosaki |
| 2009/0225348 | A1 | 9/2009 | Miyake et al. |
| 2009/0225357 | A1 | 9/2009 | Miyake et al. |
| 2009/0248752 | A1 | 10/2009 | Miyake et al. |
| 2009/0262379 | A1 | 10/2009 | Miyake et al. |

FOREIGN PATENT DOCUMENTS

| | | | |
|---|---|---|---|
| CN | 101030069 | A | 9/2007 |
| JP | 6-261166 | | 9/1994 |
| JP | 2001-016388 | A | 1/2001 |
| JP | 2001-018501 | | 1/2001 |
| JP | 2002-111940 | A | 4/2002 |
| JP | 2003-110763 | | 4/2003 |
| JP | 2003-209718 | | 7/2003 |
| JP | 2006-20263 | | 1/2006 |
| JP | 2006-021501 | A | 1/2006 |
| JP | 2006-139145 | | 6/2006 |
| JP | 2006-201460 | | 8/2006 |
| JP | 2007-331121 | | 12/2007 |
| JP | 2008-149602 | | 7/2008 |

* cited by examiner

*Primary Examiner* — Saied Ebrahimi-dehKordy

(74) *Attorney, Agent, or Firm* — Edwards Wildman Palmer LLP; David G. Conlin; David A. Tucker

(57) ABSTRACT

In an image forming apparatus, damage to the apparatus caused by power conduction at the time of installation is prevented. When initial adjustment at factory ends and service person moves the apparatus, a power switch is turned OFF. Using this OFF operation as a trigger, a control unit 100 reads specific information (information related to pre-processing before starting power supply to the apparatus), and displays the information on electronic paper 108.

3 Claims, 8 Drawing Sheets

IMAGE FORMING APPARATUS

CROSS-REFERENCE TO RELATED APPLICATION

This nonprovisional application claims priority under 35 U.S.C. §119(a) on Patent Application No. 2008-076053 filed in Japan on Mar. 24, 2008, the entire contents of which are hereby incorporated by reference.

BACKGROUND OF THE INVENTION

1. Field of the Invention

The present invention relates to an image forming apparatus in which a part or parts that can move in the apparatus (hereinafter referred to as movable parts) are secured at the time of shipment and the secured parts need be released before use (before supplying power).

2. Description of the Background Art

Electronic paper is a thin display technology similar to a liquid crystal display and the like, and it has similar appearance as ordinary paper. The electronic paper is characterized in that displayed contents are electrically rewritable, and that power consumption thereof is very low as electric power is unnecessary to retain the displayed contents. In addition, electronic paper is non-volatile, that is, once the displayed contents are rewritten, the displayed contents are maintained even when power is turned off. Attempts to apply electronic paper as such have been made in various technical fields.

Japanese Patent Laying-Open No. 2003-209718 (Document 1) proposes a technique of utilizing electronic paper in a digital camera. According to the technique disclosed in Document 1, when a power button is pressed by a user while the power is on, remaining battery level is calculated, and the maximum number of pictures that can be taken is calculated from available memory space. These pieces of calculated information are output to electronic paper, and on the electronic paper, information related to the remaining battery level and the maximum number of pictures that can be taken at present is displayed. Even when the power of digital camera is turned off thereafter, the displayed contents of information related to the remaining battery level and the maximum number of pictures that can be taken before power-off are maintained.

Further, Japanese Patent Laying-Open No. 2006-201460 (Document 2) proposes a technique of utilizing electronic paper in an image forming apparatus such as a multifunctional printer. According to the technique disclosed in Document 2, information related to image formation, such as counter information and information of supplies, is displayed on electronic paper. This allows collection of necessary pieces of information without turning on the power.

SUMMARY OF THE INVENTION

Recently, so-called multifunctional printers having the functions of printer and facsimile in addition to copying function have come to be widely used as image forming apparatuses.

An image forming apparatus having multiple functions as mentioned above is shipped from a factory with its movable parts secured.

Therefore, in designing the image forming apparatus, it has been a problem to have installation personnel confirm work to be done before supplying power after installation of the apparatus and thereby to prevent any damage to the apparatus.

Though it is possible by the techniques described in Documents 1 and 2 to transmit necessary information to the user or service person even when power is off by displaying information before power off on the electronic paper, there is no disclosure of displaying on the electronic paper a method of preventing damage to the apparatus before supplying power at the time of installation of the apparatus. Therefore, by the technique described in Documents 1 and 2, the idea described above cannot be realized. Specifically, in order to solve such a problem, the techniques described in Documents 1 and 2 cannot directly be adopted.

The present invention was made in view of the foregoing, and its object is to provide an image forming apparatus of which damage caused by power conduction at the time of installation can be prevented.

In order to attain the above-described object, the present invention provides an image forming apparatus, including: a first display unit displaying state of the apparatus when power is supplied to the apparatus; a second display unit maintaining displayed contents when power is not supplied; a storage unit storing specific information; and a display setting unit for setting display such that the specific information stored in the storage unit is displayed on the second display unit when power supply to the apparatus is shut off.

In the arrangement above, even in the non-conduction state, the displayed contents are maintained on the second display unit. Therefore, even when the apparatus is not in operation, display to the installation personnel can be continued. Therefore, it becomes possible to let the installation personnel to confirm work to be done before power conduction when installing the apparatus. As a result, inadvertent damage to the apparatus can be prevented.

In the image forming apparatus above, the second display unit is a non-volatile display member.

In the arrangement above, even when the second display unit is in the non-conduction state, the contents displayed thereon can be retained. Therefore, it is possible to continue display for the installation personnel even while the image forming apparatus is not in operation, and necessary message can be given to the installation personnel.

An example of the "non-volatile display member" may include electronic paper.

According to an aspect, the second display unit also serves as the first display unit.

The arrangement above enables display both during the time of power conduction and during the time of non-conduction without increasing cost of the apparatus, and it is unnecessary for the user to see a plurality of displays. Therefore, interface with the user is not degraded.

Further, in the image forming apparatus described above, the specific information includes caution information indicating an item to which installation personnel must pay attention when the apparatus is installed. Preferably, the caution information includes information related to a lock mechanism for securing a movable part in the image forming apparatus.

Here, the "caution information" includes, by way of example, information related to a lock mechanism for securing movable parts such as a paper feed cassette and a scanner (optical system).

According to the present invention, when the apparatus is installed, contents of work that must be done before supplying power to the apparatus are displayed as specific information and, therefore, damage to the apparatus caused by power conduction at the time of installation can be prevented.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is an exemplary display on an electronic paper showing items to be processed before power on.

FIG. 6 is an exemplary display on an electronic paper showing items to be processed before power on and portions to be referred to of an installation manual or the like.

DESCRIPTION OF THE PREFERRED EMBODIMENTS

In the following, an embodiment of the present invention will be described in detail with reference to the appended figures.

<Overall Configuration of Image Forming Apparatus 20>

Figure 1:
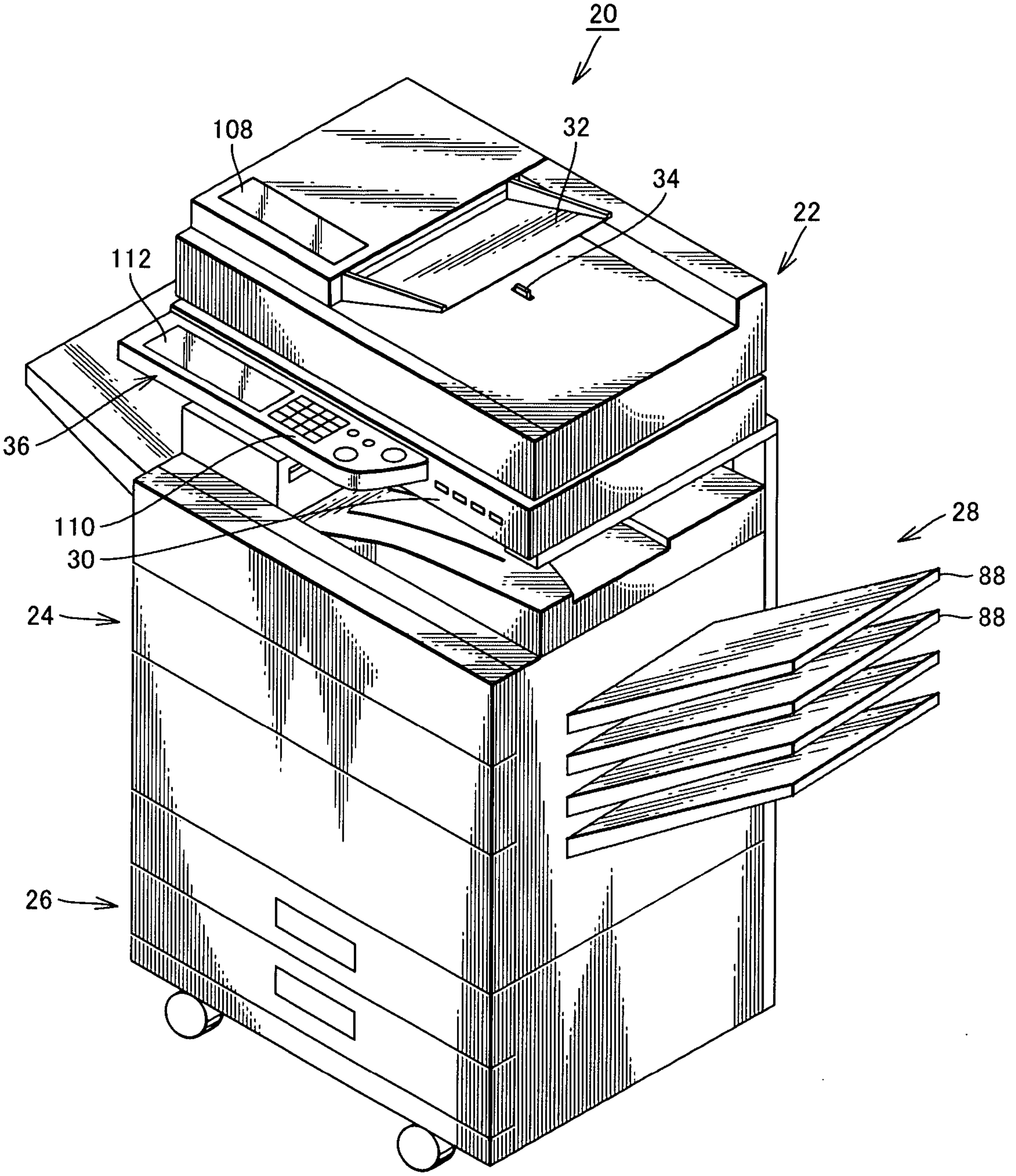
FIG. 1 is a perspective view showing an outer appearance of an image forming apparatus in accordance with an embodiment of the present invention.
Figure 2:
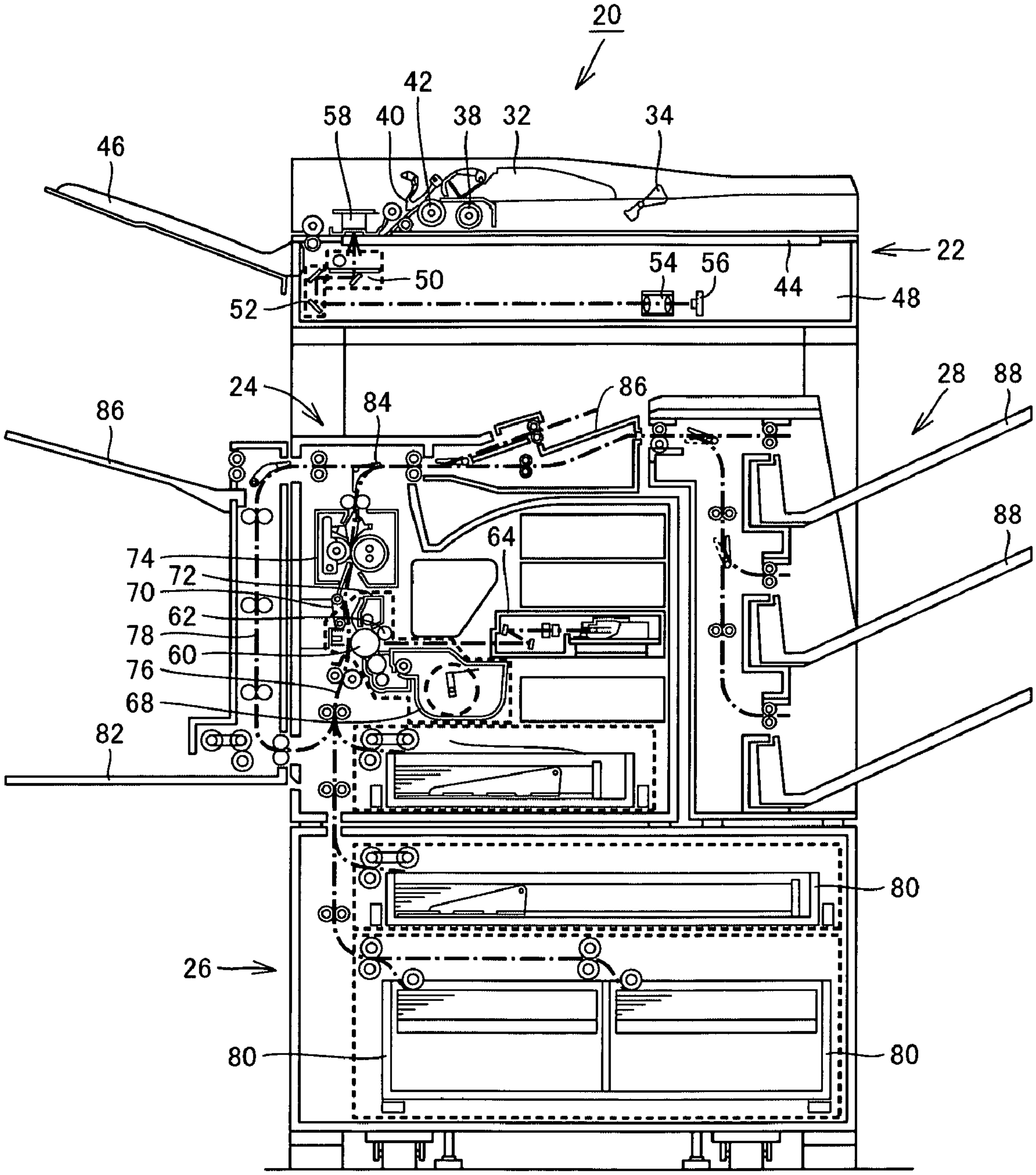
FIG. 2 schematically shows an internal configuration of the image forming apparatus.

FIG. 1 is a perspective view showing an appearance of an image forming apparatus 20 in accordance with the embodiment of the present invention, and FIG. 2 schematically shows an internal configuration of image forming apparatus 20.

Referring to FIGS. 1 and 2, an image forming apparatus 20 in accordance with the present embodiment is a digital multifunctional printer, and it is capable of operating selectively in, for example, a copy mode in which an image of a document is read and printed on a sheet of printing paper, a facsimile mode in which an image of a document is read and transmitted and an image of a document is received and printed on a sheet of printing paper, and a printer mode in which an image received through a network from an information terminal, not shown, is printed on a sheet of printing paper.

Image forming apparatus 20 includes a document feeding and reading unit 22, an image forming unit 24, a paper feeding unit 26, a post processing device 28, and a USB (Universal Serial Bus) interface 30.

Internal configuration of image forming apparatus 20 will be described taking an operation in the copy mode as an example.

When a document is set on a document set tray 32 of document feeding and reading unit 22 of image forming apparatus 20, first, a document detection sensor 34 detects that the document has been set. Operating unit 36 of document feeding and reading unit 22 is operated to input and set size of printing paper, magnification and the like. Thereafter, an instruction to start copying is given in accordance with the contents of operation on operating unit 36.

In response to an operation of operating unit 36, document feeding and reading unit 22 draws the document on document set tray 32 one by one, by pick-up roller 38, and feeds the drawn document to a platen glass 44 through a separation plate 40 and a feed roller 42, feeds the document in a sub-scanning direction on platen glass 44, and discharges the document to a document discharge tray 46.

At this time, a surface (lower surface) of the document is read by a first reading unit 48. Specifically, the first reading unit 48 first moves and positions a first scanning unit 50 to a prescribed position, and positions a second scanning unit 52 at a prescribed position. The document surface is irradiated through platen glass 44 with an exposure lamp of first scanning unit 50, and light reflected from the document is directed to an imaging lens 54 through reflection mirrors of first and second scanning units 50 and 52. The light reflected from the document is collected by imaging lens 54 to a CCD (Charge Coupled Device) 56, and the image on the document surface is formed on CCD 56, whereby the image on the document surface is read.

Further, a rear surface (upper surface) of the document is read by the second reading unit 58. The second reading unit 58 is arranged above platen glass 44. The second reading unit 58 includes an exposure lamp, formed of an LED (Light Emitting Diode) array, a fluorescent lamp and the like, irradiating the rear surface of document, a SELFOC (registered trademark) lens array collecting light reflected from the document pixel by pixel, and a contact image sensor (CIS) performing photo-electric conversion of the light reflected from the document received through SELFOC lens array and outputting an analog image signal.

Further, it is possible to open an upper part of document feeding unit 22 and to place a document on platen glass 44, and to read the document surface in this state by the first reading unit 48. In this case, the first and second scanning units 50 and 52 are moved in the sub-scanning direction while maintaining a prescribed speed relation to each other, whereby the document on platen glass 44 is exposed by the first scanning unit 50 and the light reflected from the document is guided by the first and second scanning units 50 and 52 to imaging lens 54. The document image is formed on CCD 56 by the imaging lens 54.

Figure 3:
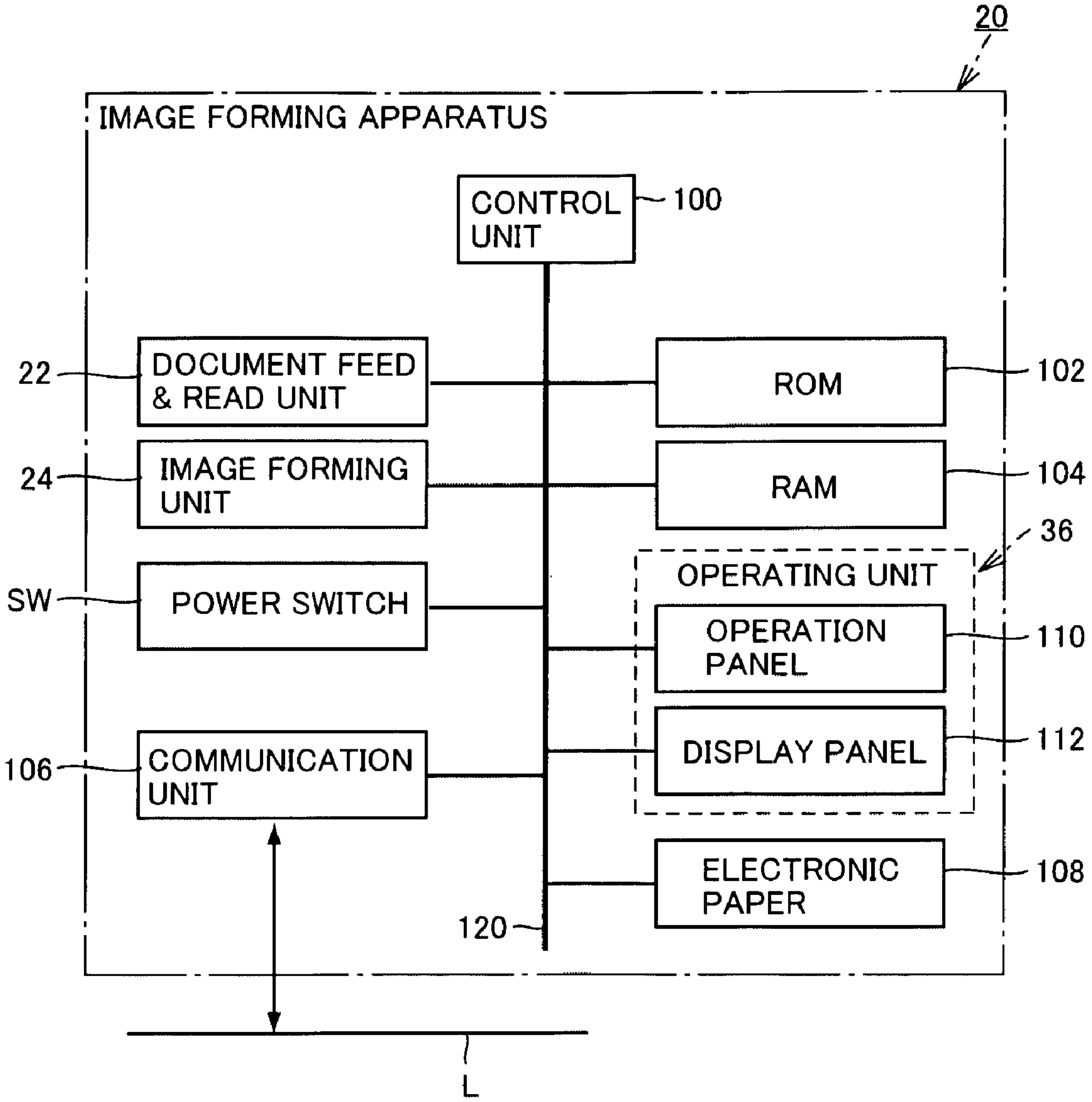
FIG. 3 is a block diagram showing hardware configuration of the image forming apparatus.

When one or both surfaces of the document are read in the above-described manner, image data representing the image or images on one or both surfaces of the document is input to a control unit 100 implemented, for example, by a microcomputer shown in FIG. 3, in which the image data is subjected to various types of image processing and output to image forming unit 24.

Image forming unit 24 prints the document image on a sheet of recording paper based on the image data, and it includes a photoreceptor drum 60, a charger 62, a laser scanning unit (hereinafter denoted as "LSU") 64, a developer 68, a transfer device 70, a cleaning device 72, a fixing device 74, a neutralizer, not shown, and the like.

Further, image forming unit 24 is provided with a main feeding path 76 and a reverse feeding path 78. A sheet of recording paper fed from paper feeding unit 26 is fed along main feeding path 76. Paper feeding unit 26 draws sheets of recording paper contained in paper cassette 80 or placed on a manual feed tray 82 one by one, and feeds the drawn sheet of recording paper to main feeding path 76 of image forming unit 24.

While the sheet of paper is fed along main feeding path 76 of image forming unit 24, that is, while the sheet of paper passes between photoreceptor drum 60 and transfer device 70 and further through fixing device 74, printing is done on the sheet of recording paper.

Photoreceptor drum 60 rotates in one direction, and its surface is cleaned by cleaning device 72 and the neutralizer, and then uniformly charged by charger 62.

LSU 64 modulates laser beam based on the image data output from document feeding and reading unit 22, and repeatedly scans the surface of photoreceptor drum 60 with the laser beam in the main scanning direction, whereby an electrostatic latent image is formed on the surface of photoreceptor drum 60.

Developer 68 develops the electrostatic latent image by supplying toner to the surface of photoreceptor drum 60, and forms a toner image on the surface of photoreceptor drum 60.

Transfer device 70 transfers the toner image on the surface of photoreceptor drum 60, to the sheet of recording paper passing through transfer device 70 and photoreceptor drum 60.

Fixing device 74 fixes the toner image on the sheet of recording paper, by applying heat and pressure to the sheet of recording paper.

At a connecting position between main feeding path 76 and reverse feeding path 78, a branching pawl 84 is provided. When printing is to be done only on one side of the sheet of recording paper, branching pawl 84 is positioned such that the sheet of recording paper fed from fixing device 74 is guided by branching pawl 84 to discharge tray 86 or to a post processing device 28.

When printing is to be done on both surfaces of the sheet of recording paper, branching pawl 84 is turned in a prescribed direction so that the sheet of recording paper is guided to reverse feeding path 78. The sheet of recording paper is turned over as it passes through reverse feeding path 78, and then it is again fed to the main feeding path 76 and, as the sheet of recording paper is again fed along the main feeding path 76, printing is done on the rear surface, and the sheet is guided to discharge tray 86 or post processing device 28.

The sheet of recording paper on which printing has been done as described above is guided to discharge tray 86 or post processing device 28, and discharged to discharge tray 86 or to any of discharge trays 88 of post processing device 28.

Post processing device 28 is for performing processes of sorting and discharging a plurality of sheets of recording paper to discharge trays 88, punching each sheet of recording paper, and stapling the sheets of paper. By way of example, when a number of printed copies are to be prepared, post processing device 28 sorts and discharges sheets of recording paper to discharge trays 88 such that sorted sets of copies are allotted one by one, and each set of sheets on each discharge tray 88 is punched or stapled, whereby printed copies are provided.

<Hardware Configuration of Image Forming Apparatus 20>

FIG. 3 is a block diagram showing a hardware configuration of image forming apparatus 20.

Referring to FIG. 3, image forming apparatus 20 includes document feeding and reading unit 22 capable of reading document image, image forming unit 24 providing printed output by forming an image read by document feeding and reading unit 22 on a sheet of paper with the image color reproduced by electro-photographic process, operating unit 36 allowing settings of various functions related to the image forming process as described above, and, in addition, a control unit 100, an ROM (Read Only Memory) 102, an RAM (Random Access Memory) 104, a communication unit 106, an electronic paper 108, and a power switch SW.

Operating unit 36 includes an operation panel 110 and a display panel 112. Appearances of operation panel 110 and display panel 112 will be described later.

Control unit 100 is in charge of overall control of image forming apparatus 20, and it is implemented by a CPU (Central Processing Unit) or the like.

ROM 102 stores a program, data and the like necessary for controlling an operation of image forming apparatus 20. Control unit 100 controls image forming apparatus 20 in accordance with the program and data stored in ROM 102, and executes control related to various functions of image forming apparatus 20.

RAM 104 has a function of a working memory temporarily storing results of operations and processes performed by control unit 100, a function of a back-up memory storing count value, jam and service error history information, information of supplies and the like and a function of a frame memory storing image data.

Communication unit 106 provides an interface to a network line L connected to a personal computer and a facsimile apparatus, not shown.

Displaying operation of electronic paper 108 is realized by physically moving media particles by applying bias (electrophoresis). Even when there is a transition from conduction state to non-conduction state, the moved particles (that went under electrophoresis) can retain their state and, as a result, the displayed contents are maintained. Specifically, electronic paper 108 is a non-volatile display member of which displayed contents can be kept continuously even after power conduction to display panel 112 is shut off, and it functions as an auxiliary display unit of display panel 112. Electronic paper 108 is attached to the top plate of document feeding and reading unit 22, as shown in FIG. 1.

Though not specifically shown, power switch SW is provided at an appropriate position of image forming apparatus 20.

Document feeding and reading unit 22, image forming unit 24, ROM 102, RAM 104, operation panel 110 and display panel 112 of operating unit 36, communication unit 106, electronic paper 108 and power switch SW described above are connected to a bus 120 extending from control unit 100. Therefore, document feeding and reading unit 22, image forming unit 24, ROM 102, RAM 104, operation panel 110 and display panel 112 of operating unit 36, communication unit 106 and electronic paper 108 are controlled by control unit 100. In contrast, ON/OFF of power switch SW is manually executed.

ROM 102 stores in advance specific information to be displayed on electronic paper 108. When power switch SW is turned OFF at the time of shipment after initial adjustment at factory and at the time when the apparatus is moved by a service person, the specific information stored in ROM 102 is read to control unit 100, and the read specific information is displayed on electronic paper 108. The specific information will be described later.

<Appearance of Operating Unit 36>

Figure 4:
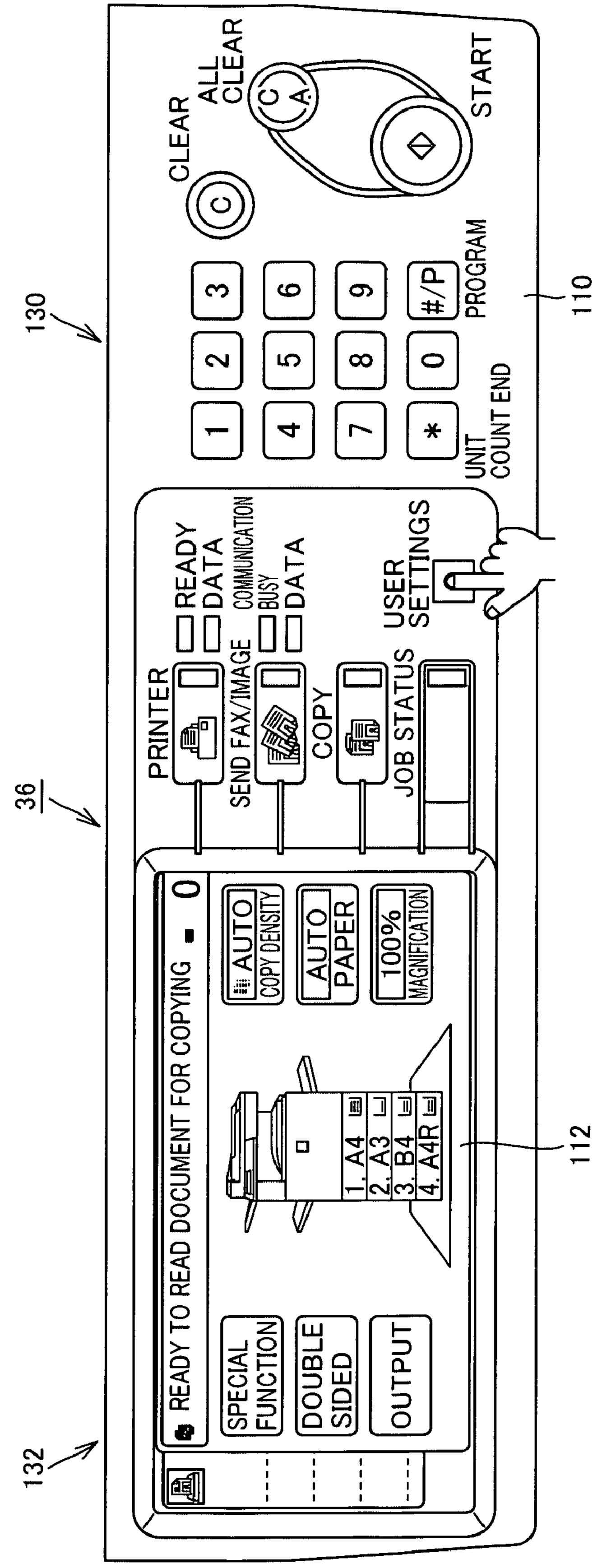
FIG. 4 is a plan view showing an appearance of an operating unit.

FIG. 4 is a plan view showing an appearance of operating unit 36.

Referring to FIG. 4, operating unit 36 is formed by integrating operation panel 110 and display panel 112. Operating unit 36 is divided into two areas 130 and 132.

Specifically, operation panel 110 is placed on the right area 130 of operating unit 36, and on which ten keys and various other operation buttons are provided. On the other hand, display panel 112 is arranged from the center to the left area 132 of operating unit 36, and it is formed of a small, touch-panel integrated type liquid crystal display.

It is possible to confirm the state of image forming apparatus 20, job processing status, and the like, from the display on display panel 112 of operating unit 36. Further, it is possible to set functions and to instruct an operation of image forming apparatus 20 and the like, by selecting, on the touch panel superposed on the display area, a select button displayed on the display area of liquid crystal display of display panel 112.

<Operation>

In image forming apparatus 20, there are a plurality of movable parts including the scanner and paper cassette 80. In order to prevent damage to the movable parts such as the scanner and paper cassette 80 when the apparatus is shipped or moved, a lock mechanism is provided.

The lock mechanism for the movable parts is fixed by mechanical structure, for example, a screw or a pin to be inserted. Therefore, if the power switch SW should be turned ON without releasing the lock mechanism and power supply to image forming apparatus 20 starts, the movable parts secured by the lock mechanism would be driven by a motor, possibly resulting in damage to the movable parts as well as to driving members such as wires and gears.

Therefore, power switch SW is turned OFF at the time of shipment from factory and at the time of moving the apparatus, and using the switch off as a trigger, information related to pre-processing before starting power conduction to the apparatus is displayed on electronic paper 108. The display of specific information on electronic paper 108 is maintained until power switch SW is turned ON and power supply to image forming apparatus 20 starts after the end of installation of image forming apparatus 20, because of the characteristics of electronic paper 108. Therefore, the specific information mentioned above is given to the user and service person as the installation personnel. As a trigger to turn OFF the power switch SW, an operation of pressing a specific key, for example, any of the ten keys or a clear key on operating unit 36 shown in FIG. 4, which does not affect operation of the apparatus, may be used. By turning the power OFF while the specific key is pressed, a display in accordance with the pressed key is displayed on electronic paper 108.

The specific information to be displayed on the electronic paper is stored in advance in ROM 102 of image forming apparatus 20. Therefore, when power switch SW is turned OFF after the end of initial adjustment at factory and when the apparatus is moved by service person, control unit 100 reads the specific information from ROM 102 using switch-off as a trigger, and displays the read information on electronic paper 108.

Thereafter, shipping personnel at the factory and service person secure the movable parts such as the scanner and tray by the lock mechanism, and image forming apparatus is shipped and moved.

Figure 5:
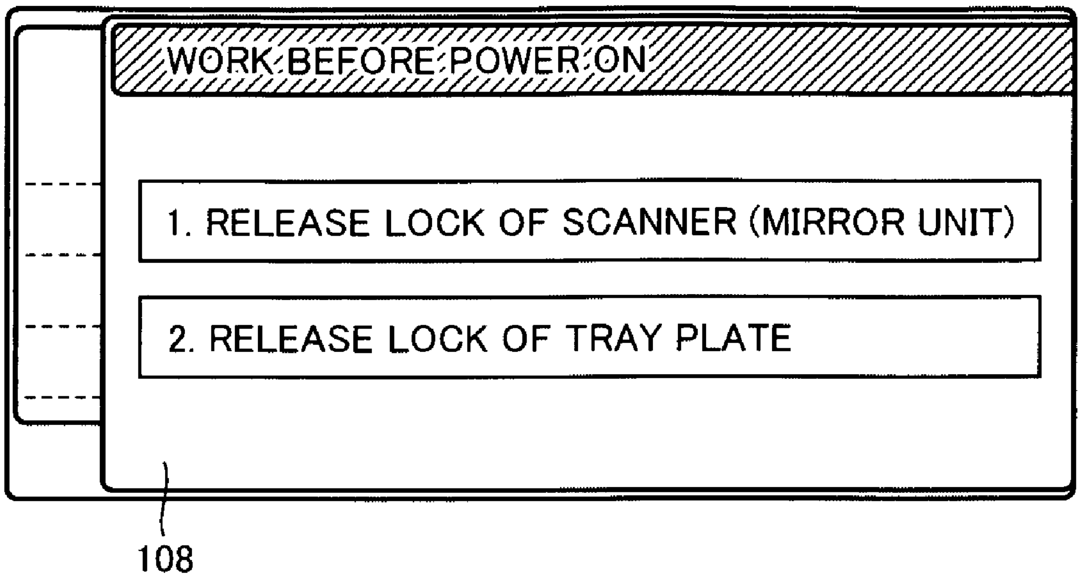
Figure 6:
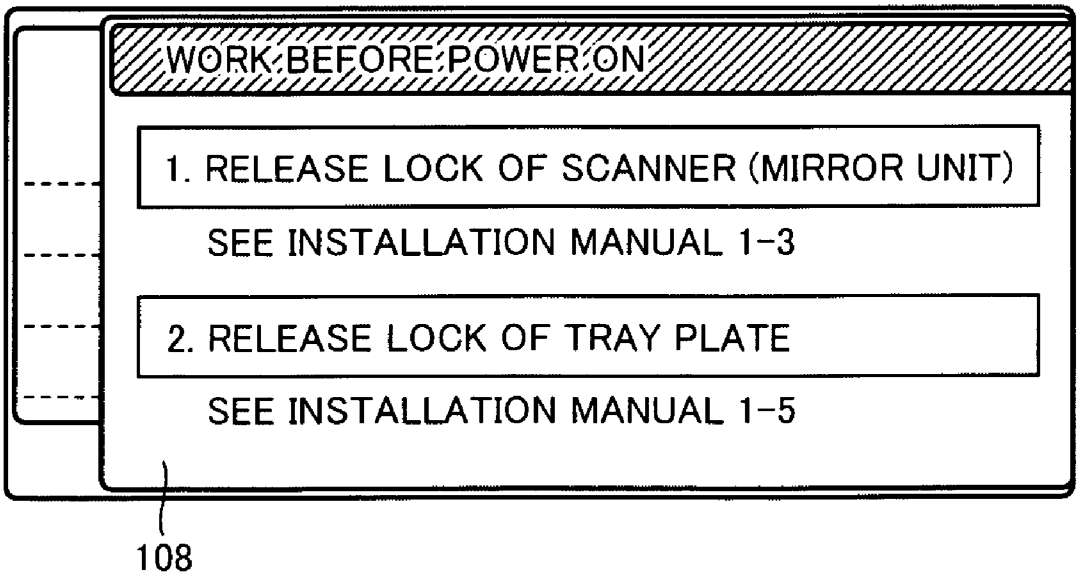
Figure 7:
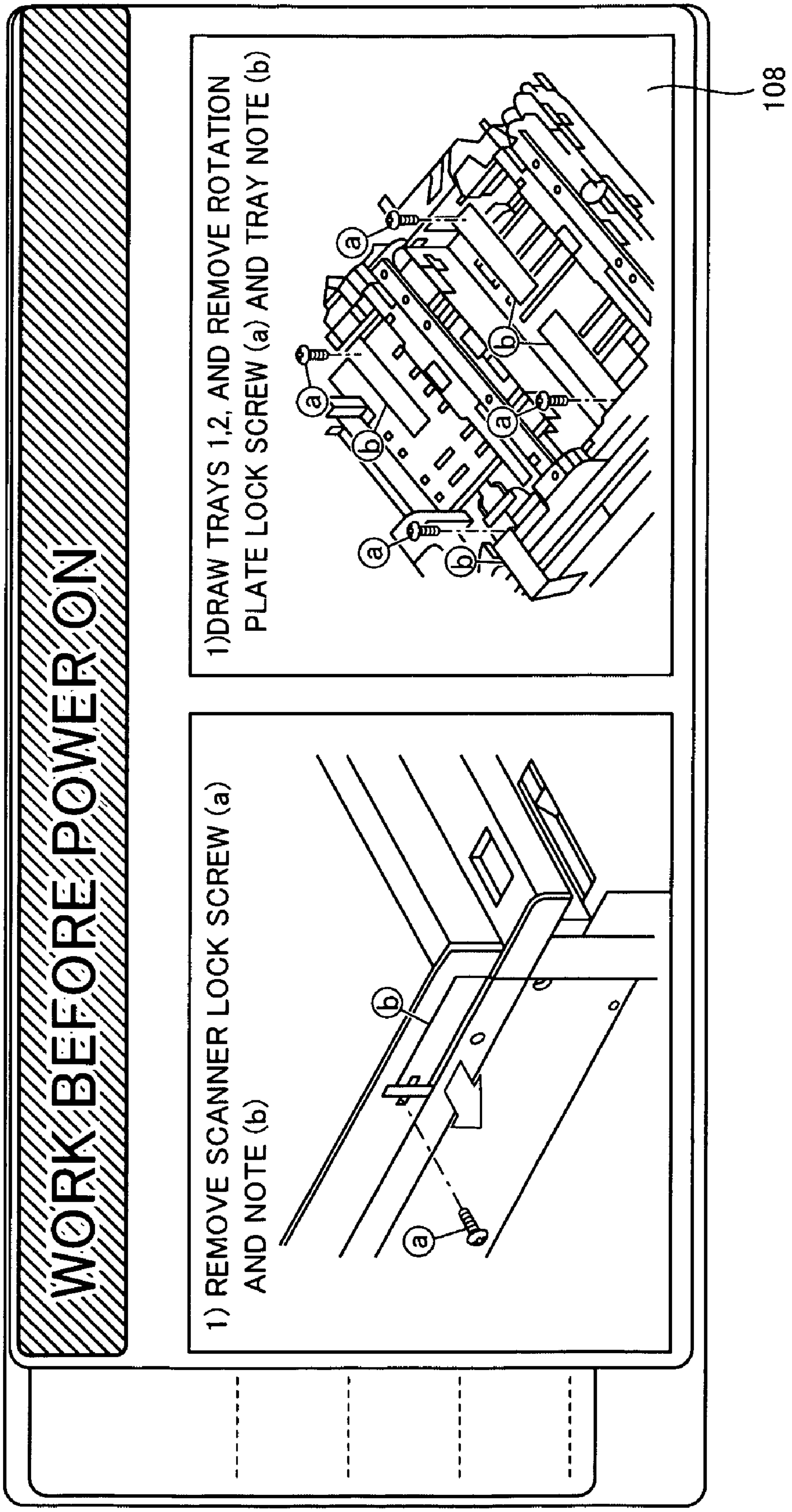
FIG. 7 is an exemplary display on an electronic paper showing an image representing work sequence for releasing lock mechanism.

Exemplary manner of display of specific information on electronic paper 108 includes those shown in FIGS. 5, 6 and 7.

FIG. 5 shows an example in which only the messages "1. RELEASE LOCK OF SCANNER (MIRROR UNIT)" and "2. RELEASE LOCK OF TRAY PLATE" are displayed as pre-processing items before power on. FIG. 6 shows an example in which the pre-processing items before power on mentioned above and portions to turn to of installation manual are displayed on electronic paper 108. Further, FIG. 7 shows an example in which an image representing work sequence for releasing the lock mechanism is displayed on electronic paper 108. By changing the manner of display of specific information, better user interface to the user and service person as installation personnel can be realized. Further, in any of the displays shown in FIGS. 5 to 7, a message "WORK BEFORE POWER ON" is displayed in highlight. The highlighted display draws the attention of the user and service person to releasing the lock mechanism before turning ON the power switch SW and starting power supply to image forming apparatus 20.

<Functions/Effects>

The present embodiment provides the following functions/effects.

Electronic paper 108 maintains displayed contents even in a state of non-conduction. Therefore, even when the operation of the apparatus is stopped, display to the installation personnel of image forming apparatus 20 (a concept including the user and service person) can be continued. Therefore, it becomes possible to let the installation personnel confirm the contents of work to be done before power conduction, when, for example, image forming apparatus 20 is installed. As a result, inadvertent damage to image forming apparatus 20 can be prevented. Specifically, when image forming apparatus 20 is installed, contents of work that must be done before starting power supply to image forming apparatus 20 (before turning ON the power switch SW) are displayed as specific information on electronic paper 108. Therefore, damage to image forming apparatus 20 caused by power conduction at the time of installation can be prevented.

Further, the contents of specific information displayed on electronic paper 108 are maintained even in the non-conduction state and, therefore, the display for the installation personnel can be continued even when image forming apparatus 20 in not in operation. As a result, necessary message can be given to the installation personnel.

The present invention is not limited to the embodiment above.

Figure 8:
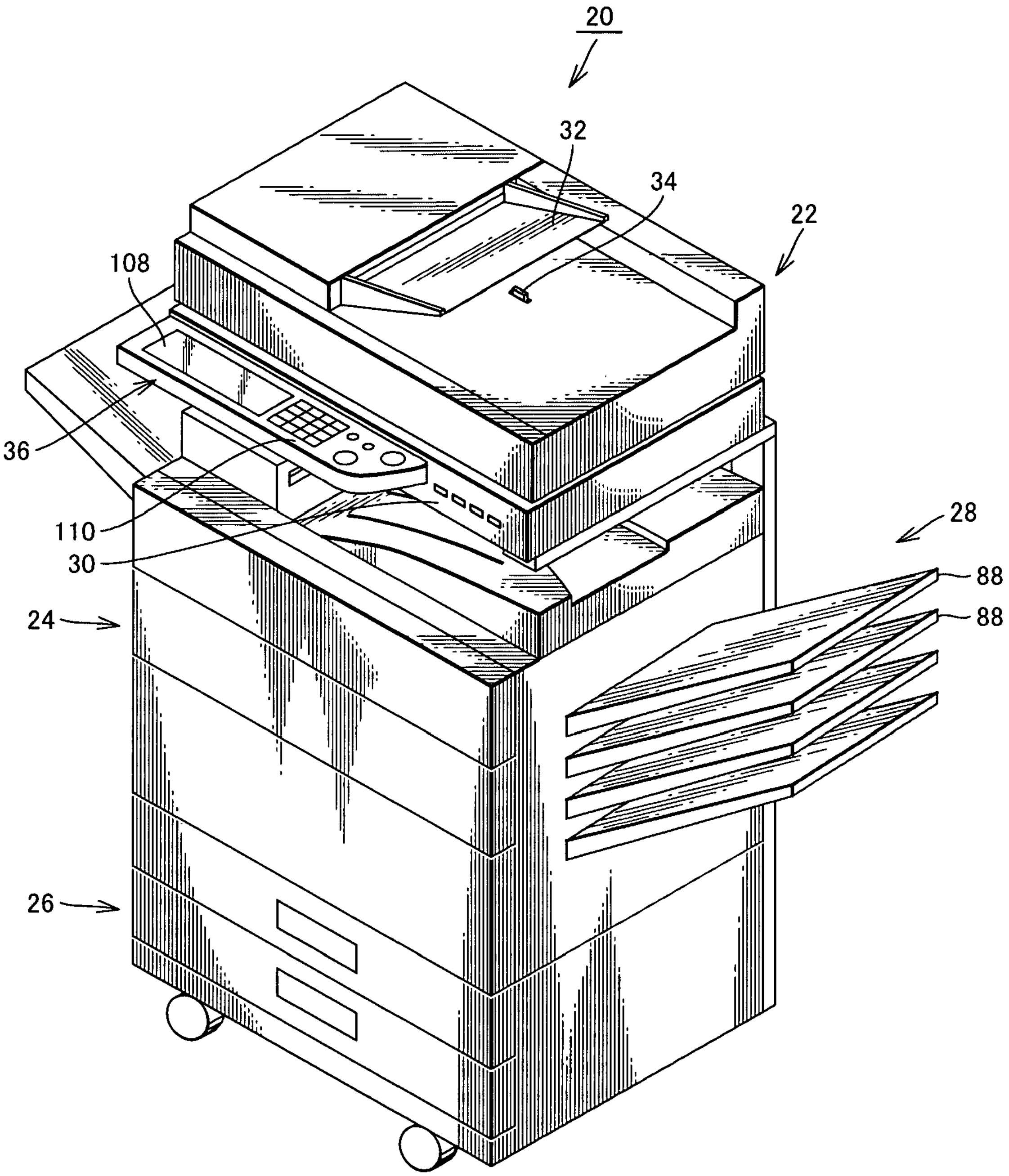
FIG. 8 is a perspective view showing an appearance of the image forming apparatus in accordance with a modification of the present invention.
Figure 9:
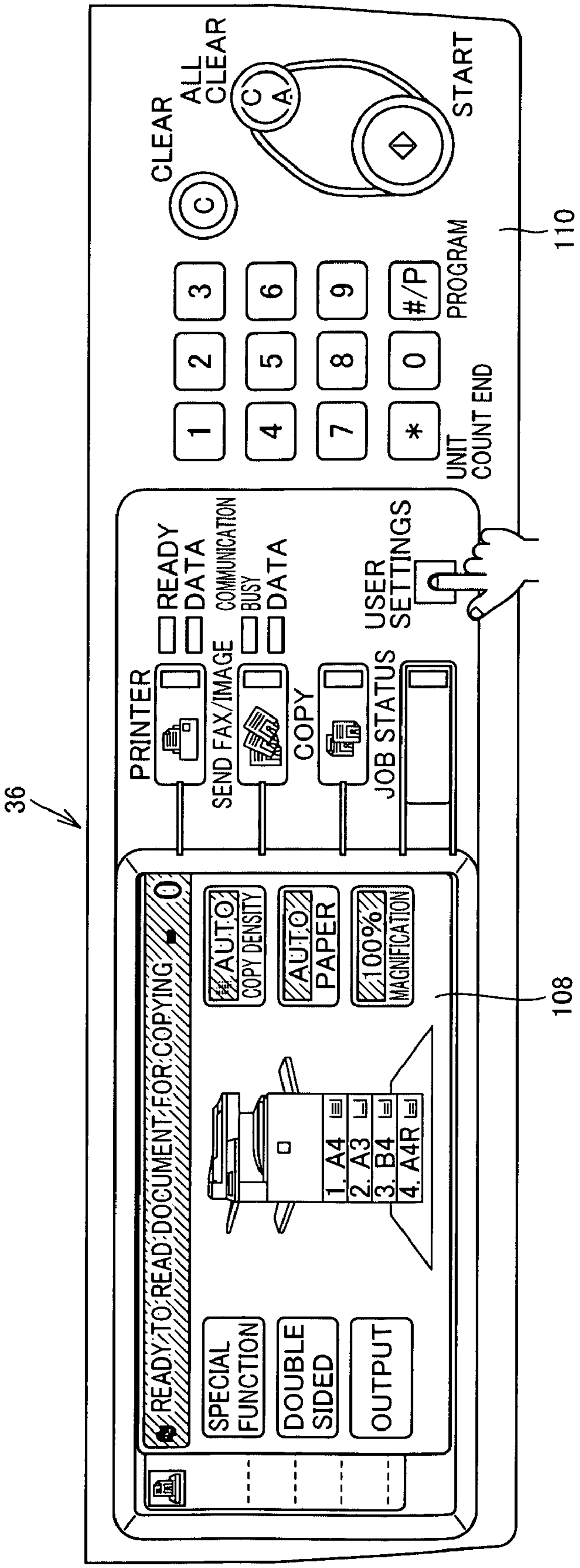
FIG. 9 is a plan view showing an appearance of the operating unit of the modification.

For instance, in the embodiment above, an example has been described in which display panel 112 and electronic paper 108 are provided independent from each other. The present invention, however, is not limited to such a configuration. As shown in FIGS. 8 and 9, in place of display panel 112 of operating unit 36, electronic paper 108 may be provided, and electronic paper 108 may operate also as a display panel of operating unit 36. By this arrangement, display during power conduction and during non-conduction becomes possible without increasing cost of the apparatus, and it is unnecessary for the user to see a plurality of displays. Therefore, interface with the user is not degraded.

Further, in the embodiment above, the operation of turning OFF the power switch SW is used as a trigger for displaying the specific information on electronic paper 108. The present invention, however, is not limited to such an arrangement. An arrangement may be adopted in which display setting of specific information on electronic paper 108 is enabled by turning OFF the power switch SW while a prescribed one of ten keys on operation panel 110, for example, "1" or "2" is pressed.

Various other design changes and modifications may be made within the scope of claims as appended to the present specification.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image forming apparatus comprising:

a first display unit displaying state of the apparatus when power is supplied to the apparatus;

a second display unit maintaining displayed contents when power is not supplied;

a storage unit storing specific information; and a display setting unit for setting display such that said specific information stored in said storage unit is displayed on said second display unit when power supply to the apparatus is shut off, wherein said specific information includes caution information indicating an item to which installation personnel must pay attention when the apparatus is installed; and said caution information includes information related to a lock mechanism for securing a movable part in said image forming apparatus.

2. The image forming apparatus according to claim 1, wherein said second display unit is a non-volatile display member.

3. The image forming apparatus according to claim 1, wherein said second display unit also serves as said first display unit.

* * * * *